United States Patent
Kroening

(10) Patent No.: US 7,062,645 B2
(45) Date of Patent: Jun. 13, 2006

(54) BUILD TO ORDER PERSONAL COMPUTER MANUFACTURING FAST BOOT METHOD

(75) Inventor: James L. Kroening, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 704 days.

(21) Appl. No.: 10/101,682

(22) Filed: Mar. 19, 2002

(65) Prior Publication Data

US 2002/0108033 A1   Aug. 8, 2002

Related U.S. Application Data

(63) Continuation-in-part of application No. 09/562,870, filed on May 1, 2000, now abandoned, which is a continuation of application No. 09/090,118, filed on Jun. 4, 1998, now Pat. No. 6,080,207.

(51) Int. Cl.
G06F 9/24 (2006.01)
G06F 9/445 (2006.01)

(52) U.S. Cl. ............... 713/1; 713/2; 717/174
(58) Field of Classification Search ............ 713/1, 713/2

See application file for complete search history.

(56) References Cited

U.S. PATENT DOCUMENTS

| | | | |
|---|---|---|---|
| 5,894,571 A * | 4/1999 | O'Connor | 713/2 |
| 5,995,757 A * | 11/1999 | Amberg et al. | 717/175 |
| 6,080,207 A | 6/2000 | Kroening et al. | 717/11 |
| 6,209,088 B1 | 3/2001 | Reneris | 713/1 |
| 6,247,126 B1 | 6/2001 | Beelitz et al. | 713/1 |
| 6,289,449 B1 | 9/2001 | Aguilar et al. | 713/2 |
| 6,292,890 B1 | 9/2001 | Crisan | 713/2 |
| 6,317,826 B1 | 11/2001 | McCall et al. | 713/1 |
| 6,385,766 B1 * | 5/2002 | Doran et al. | 717/174 |
| 6,487,718 B1 * | 11/2002 | Rodriguez et al. | 717/177 |
| 6,543,047 B1 * | 4/2003 | Vrhel et al. | 717/121 |
| 6,721,946 B1 * | 4/2004 | Fogarty et al. | 717/175 |

* cited by examiner

*Primary Examiner*—Thomas Lee
*Assistant Examiner*—Ji H. Bae
(74) *Attorney, Agent, or Firm*—Ross Hunt; Stites & Harbison PLLC

(57) ABSTRACT

An apparatus and method for providing a quicker boot for computer systems is provided. The hibernation state file content of a similar computer system is captured and sent to a unit being manufactured. As a result, the unit being manufactured may operate according to the hibernation state. When the unit is operating in such a fashion, the time required for a reboot is reduced which may provide for more efficient software installation for build to order computer systems.

22 Claims, 6 Drawing Sheets

BUILD TO ORDER PERSONAL COMPUTER MANUFACTURING FAST BOOT METHOD

CROSS REFERENCE TO RELATED APPLICATION

The present application is a continuation-in-part application of U.S. patent application Ser. No. 09/562,870 filed May 1, 2000 now abandoned which is a Continuation of U.S. patent application Ser. No. 09/090,118 filed Jun. 4, 1998, now U.S. Pat. No. 6,080,207. Said U.S. patent application Ser. Nos. and 09/090,118 are hereby incorporated by reference in their entirety.

FIELD OF THE INVENTION

The present invention generally relates to the field of computer manufacture, and more particularly to an apparatus and method for providing efficient software delivery to computers during manufacture.

BACKGROUND OF THE INVENTION

Software installation during the manufacture of personal computers is a slow process. When software is installed on a hard drive, the hard drive must be initialized and formatted. Software is then physically copied or loaded onto the hard drive from a floppy disk or a CD ROM disk.

Another aspect which makes software installation a timely process is the requirement of rebooting the system upon the installation of a piece of software. For example, upon the installation of a collection of software programs, the computer system must be rebooted before additional software is installed. In total, a computer system may require several reboots until the entire software installation is complete. Each boot typically requires at least three or four minutes, during which time no further installation of the computer system may occur. Reducing the amount of time spent in a boot would reduce the amount of time to completely assemble a computer system and provide more efficient software delivery to computer systems. Consequently, an apparatus and method for providing a quicker boot for computer systems during software installations is necessary.

SUMMARY OF THE INVENTION

Accordingly, the present invention is directed to an apparatus and method for providing a quicker boot for computer systems. In one embodiment of the invention, a fast boot process in accordance with the present invention is produced by capturing a hibernation state file content of a similar hardware system and incorporating the hibernation state file content into installation software. During a manufacturing process according to an embodiment of the invention, a unit being manufactured may receive the image in software delivery with the hibernation state content file. The unit being manufactured may employ a hibernation state that may reduce the boot time of the unit being manufactured allowing for more efficient software installation.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
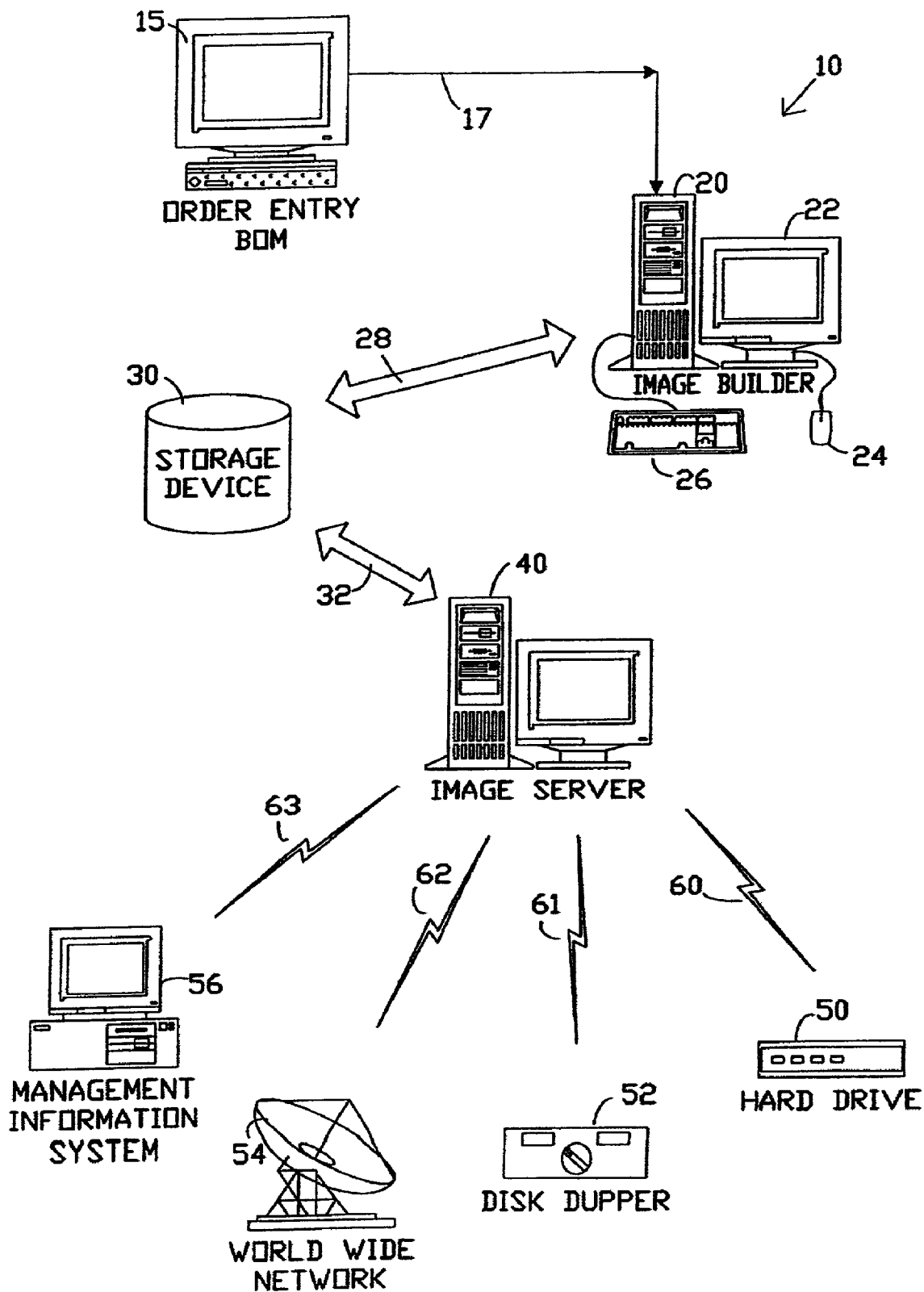
FIG. 1 is a block representation of an exemplary system for creating and delivering a disk image corresponding to a desired software configuration.

FIG. 1 illustrates a disk image process for creating and delivering a disk image corresponding to a desired software configuration. The disk image process utilizes a computerized network system 10 for creating and delivering custom software configurations defined by purchasing customers. The disk image process utilizes intelligence and granularity in generating the desired software configuration. Included within the computerized network system 10 is an image builder 20 that creates a disk image of the desired software configuration and then transfers that image to a storage device 30. The storage device 30 is connected to an image server 40 that performs the task of delivering the image. The image may be delivered directly to a hard drive 50 during a manufacturing and assembly process of a computer system. The image may also be delivered to a disk dupper 52 for duplicating the image on a computer readable medium, a ground based transmitter 54 for broadcasting the image, or to a management information system (MIS) 56.

The first step in the disk image delivery process involves entering a customer's order into an order entry system 15 to establish a bill of materials (BOM). The bill of materials includes a customer's selection of a desired software configuration for a particular computing system. Included within the bill of materials are hardware parameters of the computing system to be receiving the software configuration, including BIOS and CMOS settings plus other pertinent information as may be necessary. This information is used by the image builder to create a digital image of the desired software configuration.

In one embodiment, the order entry system 15 is a minicomputer. A minicomputer is a multi-processing system capable of supporting from four to about two hundred users simultaneously. Minicomputers are well known to those skilled in the art. For example, an IBM AS/400 minicomputer functions as the order entry system 15 in one embodiment. In terms of size and power, a minicomputer falls between a workstation and a mainframe. Equivalent inputting methods are acceptable as an alternative to using a minicomputer, such as the use of a workstation or a mainframe.

Information included within the bill of materials corresponds to the particular software configuration desired by a customer, plus specifics on the computing system receiving the software configuration. A desired configuration may be an upgrade to an application already installed on the computing system or the configuration may be a new hard drive that is to be configured with an operating system and a variety of applications. Specifics on the computing system include, but are not limited to the following parameters, hard drive size, installed accessories, current software configuration, BIOS and CMOS settings. Information corresponding to the bill of materials as generated by the order entry system is applied to the image builder over interface 17. Interface standards between a minicomputer and an image builder 20 are well known in the art.

The image builder 20 is coupled to the order entry system 15 via interface 17 for receiving the bill of materials which provides pertinent information for creating or building an image of the desired software configuration. Intelligence is provided in this step of the image delivery process because the image builder 20 sorts through a database of stored images to first determine if an image of the desired configuration has already been created for a prior computer configuration. These images are stored on a large capacity storage device 30 or multiple storage devices. If the image of the desired configuration has not previously been created, the image builder 20 selects an appropriate baseline image from the storage device 30 and then determines which incremental images are to be layered on top of the baseline image to achieve the desired final configuration.

These incremental images, which are also referred to as delta images, only contain additional information beyond the baseline image for achieving the desired software configuration. A level of granularity is thus achieved because of the linear flow process associated with achieving the desired configuration by adding a delta image to a baseline image. If the delta image is not in the data base, then the image builder constructs the appropriate delta image. Configuration numbers are assigned to all baseline images and delta images, which help the image builder 20 sort through all the possible images that can be used in the configuration process.

The actual steps that must be undertaken to create a digital image of a computing system's hard drive are well known to one skilled in the art. The image builder 20 looks at the data stream to be loaded on the computing system's hard drive 50. Since the disk image delivery process illustrated in FIG. 1 is a linear process, the image builder 20 goes through the baseline image file by file and identifies those areas that are different and determines what parts are to be replaced. File names are examined not only by their name but by their creation date. The image builder 20 looks at specific files by a specific name or code at the time of its creation.

In lieu of examining the baseline on a file by file basis, a bit by bit comparison may be performed. In addition to the image builder 20 performing this comparison task, another level of intelligence is obtained when the image builder 20 determines changes to be made in registry settings and in interrupt settings so that the new software configuration will operate properly on the computing system. If the desired software configuration is not compatible with the hardware of the computing system, then the image builder rejects the bill of materials as a non-functional configuration.

Either the entire image (baseline and delta) or just the delta image may be loaded onto a computing system (not shown). Methods of loading either image onto a computing system are well known to those skilled in the art. If the computing system's hard drive, such as the one depicted in FIG. 1, is currently configured and all that is needed is an application upgrade, then only the delta image is created and installed. However, if a new hard drive 50 is being configured, as in a manufacturing and assembly process, then the entire image is installed on the hard drive 50.

The image delivery process avoids having to create a new baseline for every image that is to be delivered. Furthermore, the image builder 20 contains editors that determine, for example, proper registry settings and also add directory information corresponding to installed applications and their file locations. An added benefit of layering information on top of a baseline is that it allows technical support personnel and software engineers to isolate problem areas and debug and correct problems as they arise. Because of the granularity, if a problem arises after a delta configuration was overlaid on top of baseline image, and that image is known to be error free, then it is easy to isolate the problem to the newly added delta configuration. Once another delta image is created with the fix, then the correct image is installed on the computing systems having the known error.

The image builder 20 is a computer having a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc. are types of computer-readable media. The image builder 20 is coupled to a monitor 22, a pointing device 24 and a keyboard 26. The image builder is not limited to any particular type of computer. In one embodiment, the image builder 20 is a PC-compatible computer running a version of the Microsoft Windows operating system. The construction and operation of such computers are well known within the art.

The monitor 22 permits the display of information for viewing by a user of the computer. The invention is not limited to any particular monitor 22. Such monitors include cathode ray tube (CRT) displays, as well as flat panel displays such as liquid crystal displays (LCD's). The pointing device 24 permits the control of the screen pointer provided by the graphical user interface of operating systems such as versions of Microsoft Windows. The invention is not limited to any particular pointing device 24. Such pointing devices include mousses, touch pads, trackballs, and point sticks. In one embodiment, the image builder 20 is a Gateway, Inc., desktop personal computer, the monitor 22 includes a super-VGA CRT display, and the pointing device 24 is a mouse. Finally, the keyboard 26 permits entry of textual information into the image builder 20, as known within the art, and the image builder 20 is not limited to any particular type of keyboard.

The image builder 20 is coupled to a large volume storage device 30 via interface 28. Once the image builder 20 defines an image and assigns a corresponding configuration number, the images are stored on the storage device 30. Likewise, when the image builder 20 is creating a disk image, the storage device 30 is first surveyed to find the desired configuration or a close match to the desired configuration for establishing a baseline to build upon. The storage device 30 is not limited to any specific format or structure as long as the storage device 30 comprises a computer-readable media for interfacing. The storage device 30 may be a family of hard disk drives, a floppy disk drive (into which a floppy disk can be inserted), an optical disk drive, or a tape cartridge drive. The implemented storage device 30 may be internal to the image builder 20 or may exist as a stand lone entity, as illustrated in FIG. 1.

After the image builder 20 has created an image of the desired software configuration the image is passed from the storage device 30 to an image server 40 via interface 32. The image server 30 is another computer system similar to the image builder 20. The image server 30 is the point of delivery for the disk image. The image server 30 may have a variety of interfaces as illustrated in FIG. 1. One illustrative embodiment has the image server coupled to a hard drive 50 via interface 60. This embodiment allows the hard drive 50 to be configured with an image of the desired software configuration before installation into a computer system. Another illustrative embodiment has the image server 30 coupled to a disk dupper 52 via interface 61. The disk dupper 52 duplicates the disk image on a computer readable medium, such as a floppy disk, a recordable CD, or a zip drive. Other means of copying the disk image are acceptable.

In still another illustrative embodiment, the image server 40 is coupled to a ground-based transmitter 54 via interface 62 for wireless transmission of the disk image to an end user. Depending on the transmitter's 54 operating parameters and the transmitter's relay capabilities, the image could be transmitted anywhere in the world. In lieu of the ground based transmitter 54, the image server 40 is connected to the Internet in any particular manner, by which the invention is not limited to and which is not shown in FIG. 1. Internet connectivity is well known within the art.

In one embodiment, the image server 40 includes a modem and corresponding communication drivers to connect to the Internet via what is known in the art as a "dialup connection." In another embodiment, the image server 40 includes an Ethernet or similar hardware card to connect to a local-area network (LAN) that itself is connected to the Internet via what is known in the art as a "direct connection" (e.g., T1 line, etc.). In further embodiments, the image server 40 may be connected to the Internet using a cable modem or satellite Internet connectivity (as illustrated by transmitter 54).

In yet another illustrative embodiment, the image server 40 is coupled to a management information system (MIS) 56 via interface 63. Management Information Systems may be used to support the infrastructure of businesses and organizations wherein such systems are well known to one skilled in the art.

Figure 2:
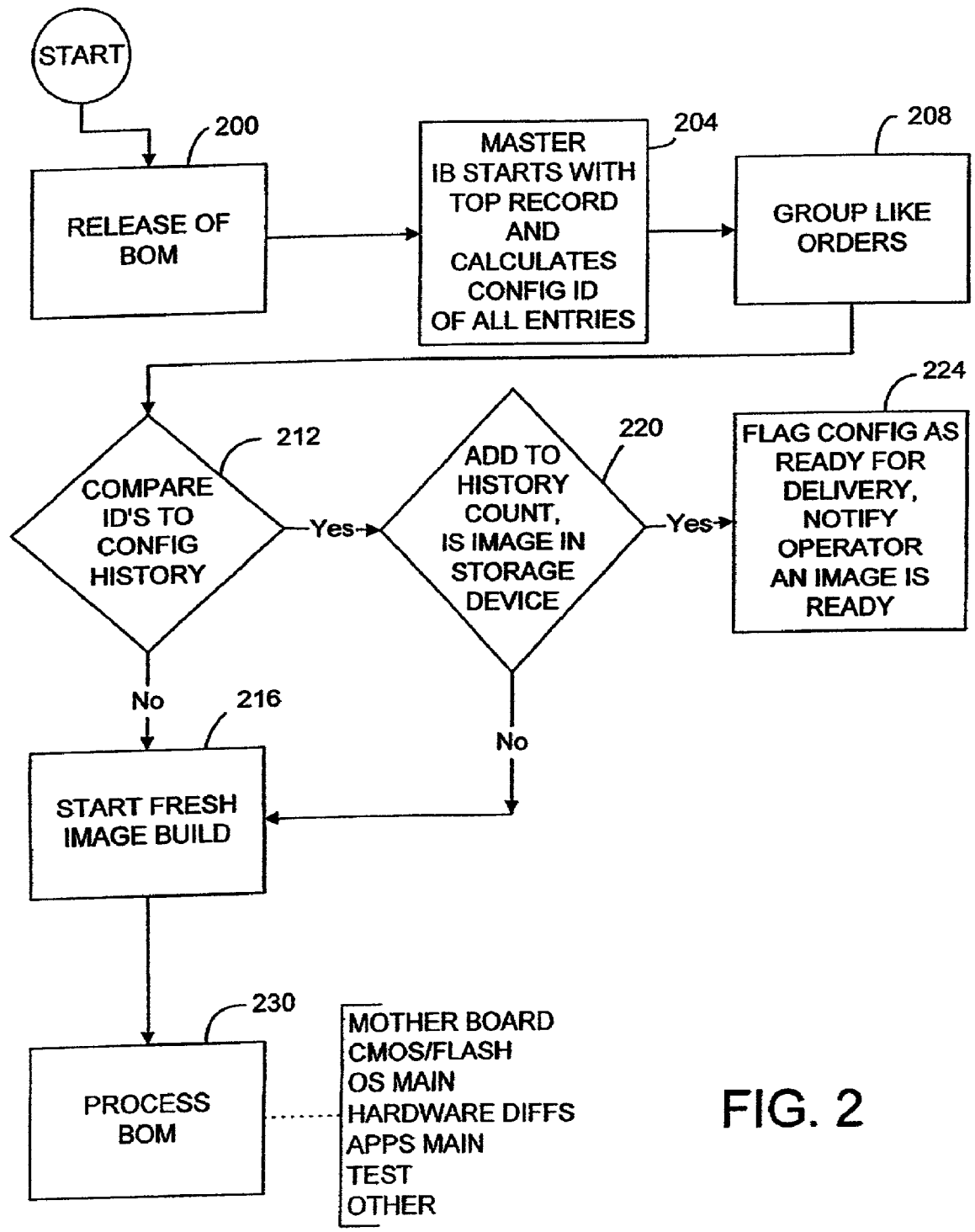
FIG. 2 is an embodiment depicting a logic flow for creating a disk image of a desired software configuration.

In referring to FIG. 2 a logic flow for creating a disk image of a desired software configuration is illustrated. Block 200 is the start of the logic flow process, which represents receipt of the customer's order. Block 200 generates the Bill of Materials (BOM).

Receipt of the bill of materials is represented by block 204. The image builder 20 starts with the top record and calculates a configuration identification (ConFig ID) of all the entries. In block 208, the image builder 20 groups like orders together. Grouping like orders together allows for increased efficiency due to the commonality between orders.

In block 212, the image builder 20 compares the configuration IDs to the configuration history. If the configuration ID corresponds to a previously configured image, then the image builder 20 looks at whether the image is in a storage device 30, as illustrated in FIG. 1. If the image is found in the storage device 30, then block 224 flags the configuration as ready for delivery and notifies an operator of the computerized network 10 that a desired image is ready. Otherwise, if the image is not found in the storage device 30, the image is created by the image builder 20 according to block 216 as a fresh build. As part of the fresh build process, block 230 requires the image builder 20 to process the bill of materials to determine the parameters for building an image according to the desired software configuration and ensure that they are compatible with the customer's hardware, software and special requirements. The final result or output from block 230 is an image or "digital picture" of the desired software configuration according to the bill of materials.

Figure 3:
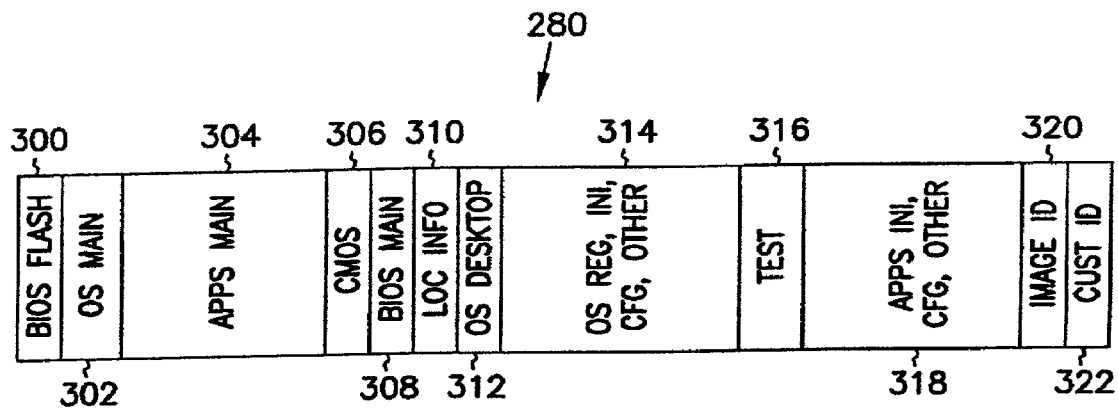
FIG. 3 is a block diagram of an exemplary structure of a disk image.

FIG. 3 illustrates an architecture of a disk image 280 as created by the image builder 20. The image builder 20 builds the image 280 in software according to a desired software configuration and delivers that image to a storage device 30. Sections of the disk image 280 are discussed in the order in which they are presented in FIG. 3. One skilled in the art will readily realize other embodiments of an image architecture.

Section 300 contains BIOS flash properties. The next two sections, sections 302 and 304, contain the main operating system and the main applications' program code or instructions. Hardware characteristics of the computing system receiving the disk image 280 are addressed by section 306 dealing with the CMOS settings, section 308 includes the main BIOS instructions, section 310 supports LOC information and section 312 supports desktop parameters for the main operating system.

Section 314 supports information including, but not limited to the following: operating system registers, initialization information and configurations files. Section 316 includes test information. Similar to section 314, section 318 includes, but is not limited to the following: application system registers, initialization information and configurations files. The last two sections contain an identification of the specific image itself 320, and the last section contains an identification of the customer 322. The identification numbers allow for future reference of the created image, which is helpful for trouble shooting problems in the software configuration and in also adding delta images to the previously delivered image in order to upgrade existing applications.

Figure 4:
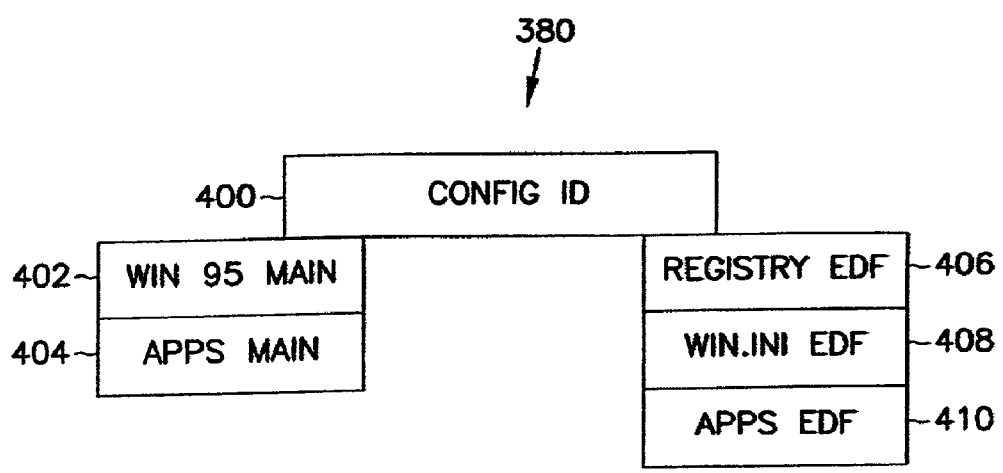
FIG. 4 illustrates an exemplary embodiment of an identification scheme for a disk image structure.

FIG. 4 illustrates an exemplary embodiment of an identification scheme 380 for a disk image structure. The image identification is a tree structure with a configuration identification number. Also included in the tree structure are underlying identification numbers corresponding to main files and underlying identification numbers corresponding to edited dynamic files (EDF).

More specifically, the identification scheme 380 includes a configuration number 380 identifying what the desired image is built from. It is the foundation from which the image builder 20 works from in creating the desired image. Once the configuration ID 380 is identified, then the main files corresponding to the operating system 402, e.g., Windows 95, and the desired application 404 are layered on top of the configuration ID 400 basic files. Edited dynamic flies corresponding to registry settings 406, operating system initialization files 408, application EDF files 410.

An image build software delivery process has been described. The process creates an image of a customer's order in software before placing the image on a hard drive or other storage means for the customer. Once an image has been created, changes or deltas to the baseline image can easily be made without having to redefine the baseline. Adding a delta image to the baseline image allows the desired image to be achieved. This method provides levels of granularity wherein incremental changes can be made to a system without having to perform major work by redefining the baseline. This allows for easy upgrades and allows technical support to function efficiently.

Figure 5:
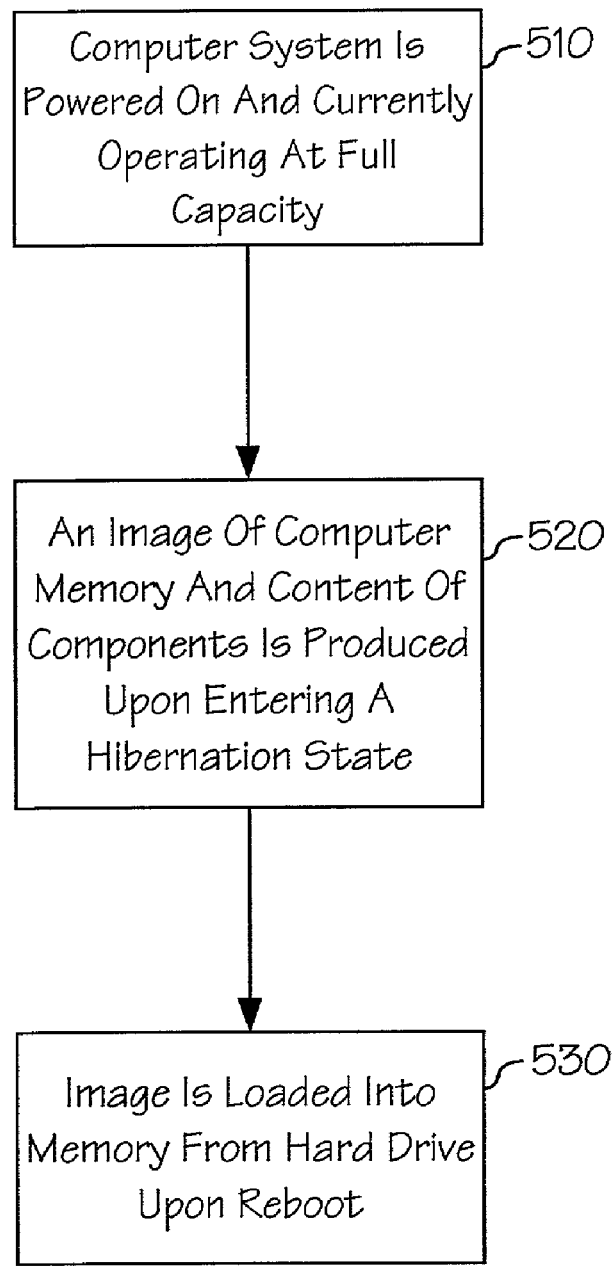
FIG. 5 depicts an embodiment of a hibernation process in accordance with the present invention.

Referring to FIG. 5, an embodiment of a hibernation process 500 in accordance with the present invention is shown. The hibernation process 500 may begin as a computer system is powered on and is currently running 510. In this state, all of the components of a computer system may be powered on and are immediately capable of operation. When a computer system enters a hibernation state, a representation of the computer memory and the content of the components of a computer may be produced 520. Upon a reboot of the computer, a hibernation representation may be loaded into memory from the hard drive 530. This is highly advantageous as the hibernation representation may be loaded quickly. This may result in a very-fast boot up of the computer system into the state it was prior to entering into the hibernation state.

In one embodiment of the invention, the operating system of the computer system controls the hibernation process 500 of the present invention. In such a fashion, the operating system may determine when the computer system should enter a hibernation state. In an embodiment of the invention, hibernation process 500 may be implemented in accordance with the Advanced Configuration and Power Interface (ACPI) specification. The ACPI specification may include S0 through S5 states wherein S0 is on, S1–S3 are sleeping states, S4 is a soft off state and S5 is an off state. Tables discernible by basic input/output system (BIOS) of the computer system may define which each state may mean for individual devices. The operating system of the computer system may determine when to move a device, or the entire system, from one state to another.

Figure 6:
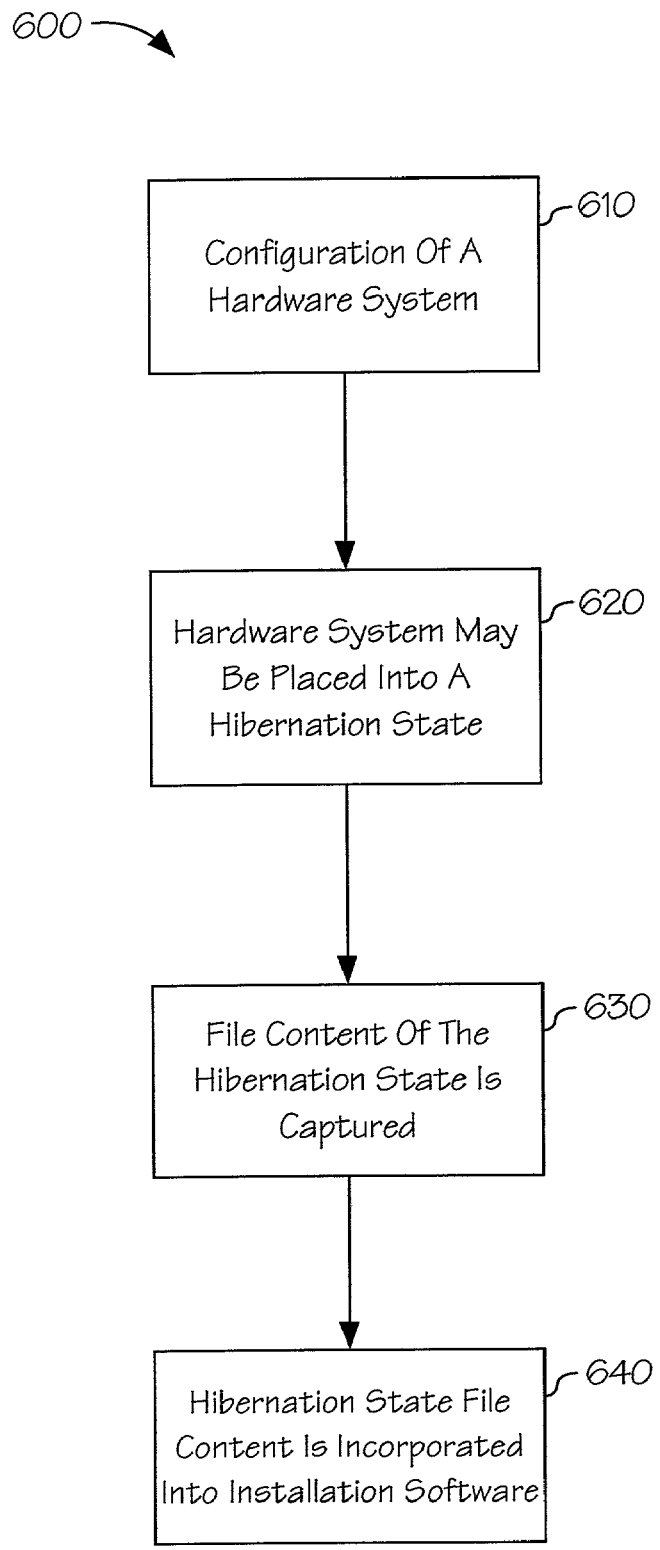
FIG. 6 depicts an embodiment of a process for retrieving a fast boot process for software installation in accordance with the present invention.

Referring to FIG. 6, an embodiment of a process 600 for retrieving a fast boot process for software installation is shown. The process may begin upon the configuration of a hardware system 610. Hardware system may be similar to units being manufactured such that a fast boot process of the present invention may be adaptable for the units being manufactured. The hardware system is placed into a hibernation state 620. Placement of the hardware system into a hibernation state may include producing an image of the computer memory and the content of the components. In one embodiment of the invention, the hardware system may be placed into a S4 hibernation state of the ACPI specification.

When the hardware system has been placed into a hibernation state, the file content of the hibernation state may be captured 630. The captured hibernation state file content may be incorporated into the software that is installed into a unit being manufactured 640. In such a fashion, software that is installed on units being manufactured may include code, or instructions, that will include the hibernation state file content. In one embodiment of the invention, the captured hibernation state file may be incorporated within a disk image of the present invention as described and shown with respect to FIGS. 1–4. However, it should be understood that the captured hibernation state file content may be incorporated in software and installed in various ways known to the art without departing from the scope and spirit of the present invention.

Figure 7:
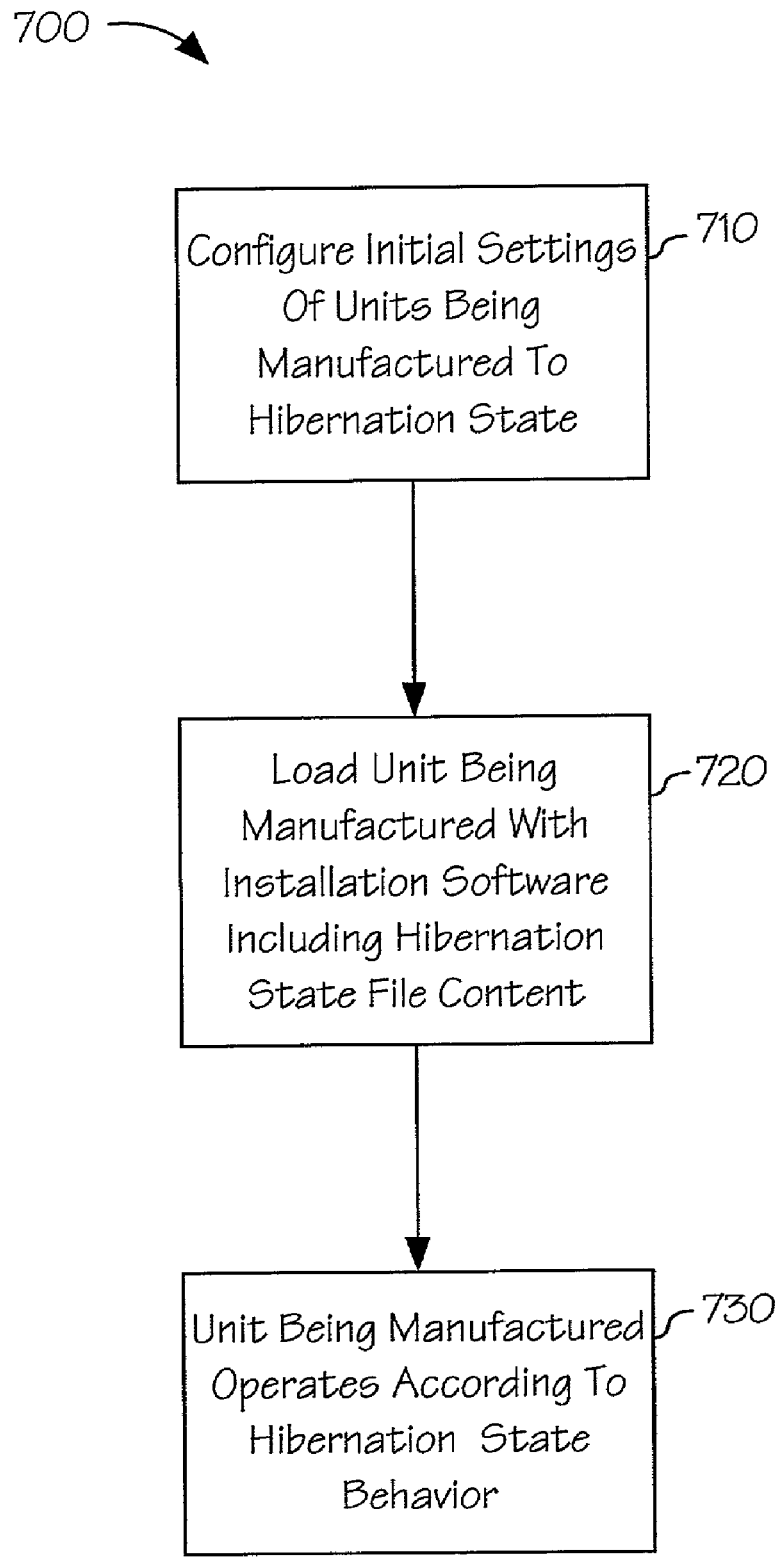
FIG. 7 is an embodiment of a process for installing software implementing a fast boot process in accordance with the present invention.

Referring now to FIG. 7, an embodiment of a process 700 for installing software implementing a fast boot process in accordance with the present invention is shown. The process may begin by configuring initial settings of a unit being manufactured to a hibernation state 710. In one embodiment of the invention, motherboard BIOS may be configured to the hibernation state. Software with the hibernation state file content may be loaded onto units being manufactured 720. In one embodiment of the invention, the unit being manufactured may receive the software with the hibernation state file content through a disk image of the present invention. Thus, a disk image, as described in FIG. 3, may be produced according to FIG. 1 which includes the hibernation state file content. It should be understood that the captured hibernation state file content may be incorporated in software and installed in various ways known to the art without departing from the scope and spirit of the present invention.

Upon receipt of software with the hibernation state file content, the unit being manufactured may operate according to the hibernation behavior state 730. This is highly advantageous as the unit being manufactured will be capable of fast reboots during software installation. This may result in more efficient software installation by decreasing the downtime of the manufacturing process during reboots of the unit being manufactured.

In an embodiment of the invention, the first power boot sequence after manufacture may be less time-consuming in accordance with process 700 of the present invention. For example, the unit being manufactured may be configured to operate according to the hibernation behavior state during the first power boot sequence. For example, the hard drive of the unit may be preset to a hibernation state. Thus, when a unit is purchased and is first powered on by a consumer, the consumer will benefit due to a fast boot sequence of the purchased unit. This is highly advantageous as it may allow for a more pleasant out of the box experience for the consumer.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method, comprising:
   (a) configuring a computer system:
   (b) placing said computer system into a hibernation state;
   (c) extracting a file content of said hibernation state of said computer system, said file content including instructions for operating during said hibernation state; and
   (d) incorporating said file content into an installation software, wherein upon an installation of said installation software into a unit being manufactured reduces a boot time of said unit by directing said unit to operate according to hibernation state behavior.

2. The method as claimed in claim 1, wherein said computer system is similar to said unit being manufactured such that said file content extracted from said computer system is adaptable to said unit.

3. The method as claimed in claim 1, wherein said hibernation state is an S4 state of according to the Advanced Configuration and Power Interface specification.

4. The method as claimed in claim 1, wherein said file content includes instructions for producing a representation of said computer system prior to entering said hibernation state.

5. The method as claimed in claim 4, wherein said representation includes data stored in memory and content of components of said computer system.

6. The method as claimed in claim 5, wherein said boot time of said unit is reduced by loading said representation upon a reboot.

7. A method, comprising:
(a) configuring initial settings of a unit being manufactured to a hibernation state;
(b) loading an installation software on said unit, said installation software including instructions for directing said unit to operate according to a hibernation state behavior; and
(c) retrieving a hibernation representation upon a reboot of said unit, wherein an amount of time required for said reboot is reduced by said unit operating according to said hibernation state behavior.

8. The method as claimed in claim 7, wherein initial settings of said unit are motherboard basic input/output instructions.

9. The method as claimed in claim 7, wherein said hibernation state is an S4 state of according to the Advanced Configuration and Power Interface specification.

10. The method as claimed in claim 7, wherein said hibernation representation includes data stored in memory and content of components of said unit.

11. The method as claimed in claim 7, wherein said unit operates according to said hibernation state behavior after manufacture is complete during a first power up of said unit by a consumer.

12. The method as claimed in claim 7, wherein said installation software is configured by an image builder, said image builder creating a disk image of a desired software configuration.

13. The method as claimed in claim 12, wherein said disk image is broadcast to said unit via a wired connection.

14. The method as claimed in claim 12, wherein said disk image is broadcast to said unit via a wireless connection.

15. An apparatus, comprising:
(a) means for configuring initial settings of a unit being manufactured to a hibernation state;
(b) means for loading an installation software on said unit, said installation software including instructions for directing said unit to operate according to a hibernation state behavior; and
(c) means for retrieving a hibernation representation upon a reboot of said unit, wherein an amount of time required for said reboot is reduced by said unit operating according to said hibernation state behavior.

16. The apparatus as claimed in claim 15, wherein initial settings of said unit are motherboard basic input/output instructions.

17. The apparatus as claimed in claim 15, wherein said hibernation state is an S4 state of according to the Advanced Configuration and Power Interface specification.

18. The apparatus as claimed in claim 15, wherein said hibernation representation includes data stored in memory and content of components of said unit.

19. The apparatus as claimed in claim 15, wherein said unit operates according to said hibernation state behavior after manufacture is complete during a first power up of said unit by a consumer.

20. The apparatus as claimed in claim 15, wherein said installation software is configured by an image builder, said image builder creating a disk image of a desired software configuration.

21. The apparatus as claimed in claim 20, wherein said disk image is broadcast to said unit by said loading means utilizing a wired connection.

22. The apparatus as claimed in claim 20, wherein said disk image is broadcast to said unit by said loading means utilizing a wireless connection.

* * * * *